United States Patent [19]

Martin

[11] Patent Number: 5,230,779

[45] Date of Patent: Jul. 27, 1993

[54] ELECTROCHEMICAL PRODUCTION OF SODIUM HYDROXIDE AND SULFURIC ACID FROM ACIDIFIED SODIUM SULFATE SOLUTIONS

[75] Inventor: Alastair D. Martin, Delamere, England

[73] Assignee: Imperial Chemical Industries PLC, London, England

[21] Appl. No.: 934,270

[22] Filed: Aug. 25, 1992

[30] Foreign Application Priority Data

Sep. 13, 1991 [GB] United Kingdom ............... 9119613

[51] Int. Cl.$^5$ .......................... C25B 1/16; C25B 1/22
[52] U.S. Cl. ...................................... 204/98; 204/104
[58] Field of Search .................... 204/98, 104

[56] References Cited

U.S. PATENT DOCUMENTS

| | | | |
|---|---|---|---|
| 2,198,045 | 4/1940 | Suchy et al. | 204/104 |
| 3,134,729 | 5/1964 | Kerti | 204/99 |
| 3,907,654 | 9/1975 | Radd et al. | 204/98 |
| 4,561,945 | 12/1985 | Coker et al. | 204/98 |

FOREIGN PATENT DOCUMENTS

| | | | |
|---|---|---|---|
| 2572430 | 3/1930 | Australia | 204/104 |
| 0096239 | 12/1983 | European Pat. Off. | |

OTHER PUBLICATIONS

"The Electrolytic Production of Acid and Alkali from Sodium Sulfate Solutions", by Harold V. Atwell et al., vol. 15, No. 6, Jun., 1923, *Industrial and Engineering Chemistry*, pp. 617–620.

Dechema Monographs, vol. 98-Verlag Chemie, 1985, pp. 291–298.

New Materials and New Processes, vol. 1, 1981, pp. 284–288.

Ion-Exchange Membranes, D. S. Fleet, 1981, pp. 195–207.

Jorissen et al., "The Behaviour of Ion Exchange Membranes in Electrolysis and Electrodialysis of Sodium Sulphate", Journal of Applied Electrochemistry 21 (1991) pp. 869–876.

*Primary Examiner*—John Niebling
*Assistant Examiner*—Patrick J. Igoe
*Attorney, Agent, or Firm*—Cushman, Darby & Cushman

[57] ABSTRACT

An electrochemical process for the production of sulphuric acid and sodium hydroxide by the electrolysis of an aqueous solution of sodium sulphate in which the concentration of the aqueous sodium sulphate solution which is electrolysed is greater than that of a saturated solution of sodium sulphate under neutral conditions and at the temperature employed.

The process may be effected in a two-compartment electrolytic cell comprising an anode compartment and a cathode compartment separated by a cation-exchange membrane.

9 Claims, 1 Drawing Sheet

ELECTROCHEMICAL PRODUCTION OF SODIUM HYDROXIDE AND SULFURIC ACID FROM ACIDIFIED SODIUM SULFATE SOLUTIONS

BACKGROUND OF THE INVENTION

1. Field of the Invention

This invention relates to an electrochemical process and more particularly to an electrochemical process for the production of sulphuric acid and sodium hydroxide from an aqueous solution of sodium sulphate. In a further aspect the invention relates to an electrochemical cell in which to operate the process of the invention.

2. Description of Related Art

Many industrial processes involve the neutralisation of either sulphuric acid or sodium hydroxide. These processes generally produce as a by-product sodium sulphate which is of little commercial value. An example of this type of process is the production of reconstituted cellulose where for every tonne of cellulose film or fibre produced, slightly more than one tonne of waste sodium sulphate is discarded. Many other processes involve the production of sodium sulphate as a by-product.

Electrochemical processes are known for the splitting of sodium sulphate into its component acid and base, sulphuric acid and sodium hydroxide.

Known electrochemical processes for the production of sulphuric acid and sodium hydroxide from aqueous sodium sulphate solutions are of two types, so-called "electrodialysis" and electrolysis. In the electrolysis type process, the electrode reactions:

Cathode: $2H_2O + 2e^- \rightarrow H_2 + 2OH^-$ and 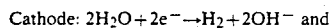

Anode: $2H_2O \rightarrow 4H^+ + O_2 + 4e^-$ 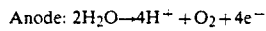

are used to split water, and ion-selective membranes are used to keep the ions apart. The process may be carried out in a two compartment cell, a three compartment cell or a cell having more than three compartments.

In the two compartment cell, an anion selective or cation selective membrane may be used to separate the anode compartment of the cell from the cathode compartment of the cell. Where a cation selective membrane is employed, an aqueous sodium sulphate stream is fed into the anode compartment of the cell where it is converted to sulphuric acid and oxygen and sodium ions migrate across the membrane to the cathode compartment where sodium hydroxide and hydrogen are produced. Where an anion selective membrane is employed, the aqueous sodium sulphate solution is fed to the cathode compartment of the cell and the sulphate ions migrate across the membrane to the anode compartment where sulphuric acid and oxygen are produced, a sodium hydroxide solution and hydrogen being produced in the cathode compartment.

In a three compartment cell which has a central compartment, an anode compartment and a cathode compartment, the aqueous sodium sulphate solution is fed into the central compartment. The central compartment is separated from the anode by an anion selective membrane and from the cathode by a cation selective membrane. When current is passed through the cell, sulphuric acid is produced in the anode compartment and sodium hydroxide in the cathode compartment, the sodium sulphate in the central compartment being depleted by an equivalent amount.

In the so-called electrodialysis process the cell comprises a series of alternating bipolar membranes and ion exchange membranes between a terminal anode and a terminal cathode. The bipolar membranes are used to split water into $H^+$ and $OH^-$, which are separated to opposing sides of the bipolar membranes under the influence of the electric field. In an electrodialysis process employing, for example, a cation-exchange membrane, aqueous sodium sulphate is charged to the anolyte side of the bipolar membranes and the sodium ions migrate through the cation selective membrane to the catholyte side of an adjacent bipolar membrane where sodium hydroxide is produced, sulphuric acid being produced at the anolyte side of the bipolar membranes.

However these known processes do suffer from disadvantages. Thus the current efficiency of the process, measured in terms of the ratio of $Na^+$ ions to the total $Na^+$ ions and $H^+$ ions transferred across the cation selective membrane, may be disadvantageously small and the concentration of sulphuric acid produced by the process may not be sufficiently great as to make the product commercially acceptable, due to the transference of $H^+$ across the membrane.

The aforementioned known processes are operated at temperatures up to 60° C. using as anolyte, aqueous sodium sulphate solutions having concentrations of up to 30 wt % sodium sulphate. A 30 wt % sodium sulphate solution is a saturated sodium sulphate solution under neutral conditions at the temperatures employed in the known processes.

SUMMARY OF THE INVENTION

The present invention provides an electrochemical process for the production of sodium hydroxide and sulphuric acid from aqueous sodium sulphate solutions in which the current efficiency tends to be substantially higher than that of heretofore known processes and in which the concentration of sulphuric acid produced by the process may be much greater, thus making the process more commercially attractive.

According to the present invention there is provided an electrochemical process for the production of sulphuric acid and sodium hydroxide by the electrolysis of an aqueous solution of sodium sulphate characterised in that the concentration of the aqueous sodium sulphate solution which is electrolysed is greater than that of a saturated solution of sodium sulphate under neutral conditions at the temperature employed.

Under neutral conditions, the concentration of a saturated solution of sodium sulphate is about 30 wt % at most temperatures, although the concentration may be higher, but at most, about 32 wt % at about 35° C. In the present invention the concentration of sodium sulphate will therefore be greater than 30 wt %, preferably greater than 32 wt % sodium sulphate, more preferably greater than 34 wt % sodium sulphate and especially greater than 36 wt % sodium sulphate based on the total weight of the solution, since we have found that the current efficiency of the process increases as the concentration of the aqueous sodium sulphate solution is increased.

It is to be understood that by electrochemical process there is meant both the so-called electrodialysis process and conventional electrolytic processes and the process of the present invention may be usefully employed in any electrochemical process for the production of sodium hydroxide and sulphuric acid from an aqueous solution of sodium sulphate provided that the sodium sulphate solution is as hereinbefore defined. Thus where the process of the invention is carried out by electrodialysis, the aqueous sodium sulphate solution is charged to the compartments on the anode side of the bipolar membrane whereas in electrolysis, the aqueous sodium sulphate solution will be charged to the anode compartment of a two compartment cell comprising a cation-exchange membrane, or to the central compartment of a three compartment cell.

However, we prefer to operate the process of the present invention in a two compartment cell wherein the anode and cathode are separated by a cation-exchange membrane, since operation in such a two compartment cell allows the use of electrodes and membranes which may usefully be employed at the higher preferred temperatures of the process as described hereinafter.

DETAILED DESCRIPTION OF THE PREFERRED EMBODIMENTS

According to a preferred embodiment of the invention there is provided a process for the production of sulphuric acid and sodium hydroxide by the electrolysis of an aqueous solution of sodium sulphate in an electrolytic cell comprising at least one anode in an anode compartment separated from at least one cathode in a cathode compartment, said anode and cathode compartments being separated by a cation-exchange membrane characterised in that the concentration of the aqueous sodium sulphate solution which is electrolysed is greater than that of a saturated solution of sodium sulphate under neutral conditions at the temperature employed.

For clarity, the invention will be described hereafter with reference to carrying out the process of the invention in the electrolytic cell of the preferred embodiment of the invention although the invention is not limited thereto.

As previously described, a saturated aqueous sodium sulphate solution under neutral conditions comprises not more than 32 wt % sodium sulphate and this has hereto established an upper limit upon the concentration of the aqueous sodium sulphate solution which is electrolysed. Furthermore, this optimum concentration of sodium sulphate is only obtainable over a very narrow temperature range between about 30° C. and about 40° C., and this has also established a narrow band of operating temperatures using such a high concentration of sodium sulphate.

In order that the concentration of the aqueous sodium sulphate solution which is electrolysed may be greater than that of a saturated solution of sodium sulphate under neutral conditions at the temperature employed, the aqueous sodium sulphate solution may be acidified, for example, the sodium sulphate solution may also comprise sulphuric acid. Thus, the aqueous sodium sulphate solution which is electrolysed may be prepared by dissolving sodium sulphate in a sulphuric acid solution, rather than water. The aqueous sodium sulphate solution may comprise at least 0.5 wt % sulphuric acid, usually at least 1 wt % sulphuric acid, preferably at least 5 wt %, more preferably at least 7 wt % sulphuric acid since the maximum possible concentration of sodium sulphate in aqueous sodium sulphate solutions comprising at least 7 wt % sulphuric acid may be substantially increased compared to neutral solutions. Where the aqueous sodium sulphate solution comprises 7 wt % sulphuric acid, the concentration of sodium sulphate may be increased to 34 wt % at 60° C.

Furthermore, the concentration of sodium sulphate in acidic aqueous sodium sulphate solutions may be substantially increased by increasing the temperature. In the known processes, no benefit in terms of sodium sulphate solubility was gained by increasing the temperature since the concentration of sodium sulphate in a saturated neutral solution of sodium sulphate does not depend significantly upon the temperature, indeed the concentration of saturated sodium sulphate solution falls slightly with increasing temperature above 35° C. for neutral solutions. However, where the aqueous sodium sulphate solution which is electrolysed is an acidified solution, in particular a solution of sodium sulphate in sulphuric aid, the concentration of the sodium sulphate may be increased with increasing temperature. Preferably therefore the temperature at which the process is operated is at least 65° C. and more preferably greater than 75° C. Furthermore, the effect of increasing the temperature on increasing the solubility of sodium sulphate is more dramatic where the aqueous sodium sulphate solution comprises at least 7 wt % sulphuric acid and especially where the solution comprises at least 12 wt % sulphuric acid and the process is preferably operated with a sodium sulphate solution comprising at least 7 wt % sulphuric acid at a temperature greater than 65° C., more preferably with a sodium sulphate solution comprising at least 12 wt % sulphuric acid at a temperature greater than 75° C. Thus the concentration of sodium sulphate in an aqueous sodium sulphate solution comprising 12 wt % sulphuric acid may, at a temperature of 80° C., be as high as 36 wt % sodium sulphate. Generally the temperature at which the process is operated will not be greater than about 100° C. since the membranes and electrodes used in the process may not operate as efficiently and for as long a time when temperatures in excess of 100° C. are employed.

It is also to be understood that in the electrochemical process of the present invention in which aqueous sodium sulphate is split into sulphuric acid and sodium hydroxide, sodium sulphate and water are consumed in the process and thus the concentration of sodium sulphate in the anolyte solution may decrease. However, in the process according to the invention the initial concentration of the aqueous sodium sulphate solution, which may be the concentration of the aqueous sodium sulphate anolyte feed solution to the anode compartment of the electrochemical cell, is greater than that of a saturated solution of sodium sulphate under neutral conditions at the temperature employed. Thus the process of the invention may comprise dissolving sodium sulphate in aqueous sulphuric acid to a concentration greater than that of a saturated solution of sodium sulphate under neutral conditions at the temperature employed and feeding the solution to the electrochemical cell.

Furthermore, in a preferred embodiment of the invention, the concentration of sodium sulphate in the solution is maintained at above that of a saturated solution of sodium sulphate under neutral conditions at the temperature employed, despite the consumption of dissolved sodium sulphate from the solution during the process and the increasing sulphuric acid concentration in the anolyte.

This may be achieved for example by resaturating the anolyte solution with sodium sulphate, for example by feeding an aqueous sodium sulphate solution to the cell which is saturated in sodium sulphate and which also contains further suspended solid sodium sulphate in order to maintain the concentration of the sodium sulphate solution as the dissolved sodium sulphate is consumed during the electrolysis.

Preferably however, the anolyte solution is resaturated by recirculating the anolyte solution through a re-saturator vessel containing solid sodium sulphate and back to the electrolytic cell. Where the electrochemical cell is a three-compartment cell, product sulphuric acid is produced in the anolyte, whilst the depleted sodium sulphate solution is removed from the central compartment. In this arrangement, at least a part of the sulphuric acid produced in the anolyte may be recycled with the depleted sodium sulphate from the central compartment in order to provide the required sulphuric acid in which to re-saturate the sodium sulphate solution returned to the central compartment of the cell. Alternatively sulphuric acid may be added directly to the depleted sodium sulphate solution recycled from the central compartment of the cell or the small amount of acid concentration produced in the central compartment due to imbalance of the efficiencies of the anion- and cation-exchange membranes employed may be allowed to build up whereby to provide the required sulphuric acid.

According to a further aspect of the present invention there is provided an electrochemical cell for the production of sulphuric acid and sodium hydroxide by the electrolysis of an aqueous acid solution of sodium sulphate comprising at least one anode in an anode compartment separated from at least one cathode in a cathode compartment by at least one ion-exchange membrane (and optionally an intermediate compartment) and a sodium sulphate re-saturation reservoir characterised in that the reservoir is in fluid flow connection with the anolyte compartment (and/or the intermediate compartment) such that at least a portion of the product therefrom may be recycled through the reservoir.

The structure of the cell, for example anode and cathode materials, the ion-exchange membrane (in particular cation-exchange membrane), and the type of cell, for example filter press type, may follow conventional technology.

Thus the cathode of the electrochemical cell may be constructed from any of the conventional materials employed for cathodes at which hydrogen is produced. Thus the cathode may comprise a metallic substrate coated with at least one platinum group metal and/or at least one platinum group metal oxide in order to reduce the hydrogen overvoltage. As examples of metallic substrates may be mentioned ferrous metals, for example iron, or preferably non-ferrous metals, for example copper or molybdenum, or alloys of these metals. However, the metallic substrate more preferably comprises nickel or nickel alloy. The metallic substrate of the cathode may be made of nickel or a nickel alloy or it may comprise a core of another metal, e.g. iron or steel, or copper, and an outer surface of nickel or a nickel alloy.

A particularly preferred cathode comprises a coating of a platinum group metal or a mixture thereof, or a platinum group metal oxide or mixture thereof, or a coating of a platinum group metal and a platinum group metal oxide on a nickel or nickel alloy substrate.

The anode of the electrochemical cell may be constructed from any of the conventional materials employed for anodes at which oxygen is produced. Typically the anode comprises a substrate of a film-forming metal, for example titanium, zirconium, niobium, tantalum, or tungsten or an alloy consisting principally of one or more of these metals, and a coating of an electrocatalytically active material, for example one or more platinum group metals, that is platinum, rhodium, iridium, ruthenium, osmium and palladium or alloys of said metals and/or an oxide or oxides thereof. Electrocatalytically active materials which are particularly suitable for use in the preferred embodiment of the invention include coatings comprising $IrO_2$, for example a coating of $IrO_2$ itself; a coating comprising $IrO_2$ in a solid solution with an oxide of a valve metal, for example a solid solution of $IrO_2$ and $Ta_2O_5$; and a coating comprising a mixture of Pt and $IrO_2$.

The nature of the cation-exchange membrane is such that the membrane should be resistant to degradation by the cell liquors, i.e. sodium sulphate, sodium hydroxide and sulphuric acid. The membrane is suitably made of a fluorine-containing polymeric material containing cation-exchange groups, for example sulphonic acid, carboxylic acid or phosphonic acid groups, or derivatives thereof, or a mixture of two or more such groups.

Such cation exchange membranes are well known in the art. Suitable cation-exchange membranes are those described, for example, in UK Patents Nos. 1184321, 1406673, 1455070, 1497748, 1497749, 1518387 and 1531068.

In operation of the process of the invention in a two-compartment cell comprising a cation-exchange membrane, the aqueous sodium sulphate solution as hereinbefore defined is charged to the anode compartment of the cell and a sodium hydroxide solution is charged to the cathode compartment of the cell, whilst in a three-compartment cell, the aqueous sodium sulphate solution as hereinbefore defined is charged to the central compartment of the cell, water or a sulphuric aid solution is charged to the anode compartment of the cell and a sodium hydroxide solution is charged to the cathode compartment of the cell. During operation of the two-compartment cell, the concentration of sodium hydroxide in the catholyte increases due to the consumption of water at the cathode to produce hydrogen and $OH^-$ and the production of sodium hydroxide by the reaction of $OH^-$ with $Na^+$ ions which migrate across the cation exchange membrane from the anolyte to the catholyte. Similarly, in a three-compartment cell the concentration of sodium hydroxide in the cathode compartment increases due to migration of $Na^+$ from the central compartment of the cell to the cathode compartment.

The concentration of the sodium hydroxide solution which is charged to the cathode compartment of the cell may vary within wide limits, depending upon the desired concentration of the final pure sodium hydroxide solution produced in the cathode compartment. Typically the concentration of the sodium hydroxide solution which is charged to the cathode compartment of the cell will be in the range from about 5 wt % to about 32 wt %, and preferably in the range from about 15 wt % to about 32 wt % such that sodium hydroxide solutions with concentrations as high as 35 wt % may be produced in the process of the invention.

The process of the invention may be operated in a batch-type process in which the aqueous sodium sulphate solution is fed to the anode compartment of the cell (or central compartment in a three-compartment cell) at the desired temperature, and sodium hydroxide solution is fed to the cathode compartment of the cell at the desired temperature. The anolyte is preferably recirculated through a separator, for example a vapour trap condenser, to separate oxygen gas produced at the anode from the anolyte solution and the anolyte solution may then be passed through a sodium sulphate re-saturator and back to the anode compartment of the cell. The sodium sulphate resaturator is preferably also maintained at the preferred temperature of operation in order to allow the maximum degree of re-saturation. The product sulphuric acid solution may then be collected, for example drained from the cell or the recirculating anolyte stream, after the desired time.

Similarly the sodium hydroxide solution charged to the cathode compartment of the cell may be recirculated through a separator, for example a vapour trap condensor, to separate hydrogen gas produced at the cathode from the catholyte solution and at least a part of the catholyte solution may then be returned to the cathode compartment.

Preferably however, the invention is operated as a continuous process in which aqueous acidified sodium sulphate solution, produced for example by dissolving sufficient sodium sulphate in sulphuric acid of the desired concentration to give the desired concentration of sodium sulphate and sulphuric acid in the anolyte feed solution, is continuously pumped into the anode compartment of the cell and aqueous sodium hydroxide solution is continuously pumped into the cathode compartment of the cell. The anolyte may be continuously withdrawn from the anode compartment and passed through a separator to separate oxygen produced at the anode from the anolyte solution and the anolyte solution may then be recirculated through a sodium sulphate saturator vessel and resaturated with sodium sulphate. The product sulphuric acid solution may be continuously tapped off from the recirculating anolyte stream. In this way the recirculating anolyte stream may provide the necessary sulphuric acid concentration so that the addition only of water and sodium sulphate in the re-saturator maintains the required sodium sulphate concentration in the feed to the anode compartment of the cell.

The flow rate of the recirculating anolyte feed to the anode compartment of the cell may vary within wide limits depending, inter alia, upon the active area of the membrane employed in the cell. The anolyte feed flow rate should be such as to ensure the maximum degree of saturation in the anolyte and the required product acid strength. The anolyte feed flow rate is typically in the range, for example, from about 0.01 meter$^3$ per hour to about 20 meter$^3$ per hour.

The process of the invention makes possible the production of sulphuric acid solutions which may be much more concentrated than those produced by known processes. Indeed the sulphuric acid solution may be a 10% sulphuric acid solution and even a 15% sulphuric acid solution. Residual sodium sulphate in the product sulphuric acid solution may be crystallised out of the solution and returned to the saturator for resaturating the recirculated anolyte.

The process of the invention may operate with a current efficiency as high as 75% and even as high as 80% whilst allowing sulphuric acid solutions having a 15% sulphuric acid concentration to be produced.

DESCRIPTION OF DRAWING

The invention is illustrated with reference to the accompanying FIGURE which is a schematic representation of apparatus for batch operation of the preferred embodiment of the invention.

In the FIGURE, a two compartment divided membrane electrolyser 1, in this case an FM-01 electrolyser (available from ICI Chemicals & Polymers Ltd) comprises an anode compartment 2 and a cathode compartment 3 separated by a cation exchange membrane 4, in this case Nafion 324 (supplied By E. I. Du Pont De Nemours) having an active area of 0.0064 m$^2$. The anode compartment is provided with an anode (not shown) comprising a titanium substrate having an $IrO_2$ electrocatalytically active coating, and the cathode compartment is provided with a cathode comprising grit-blasted nickel.

Figure 1:
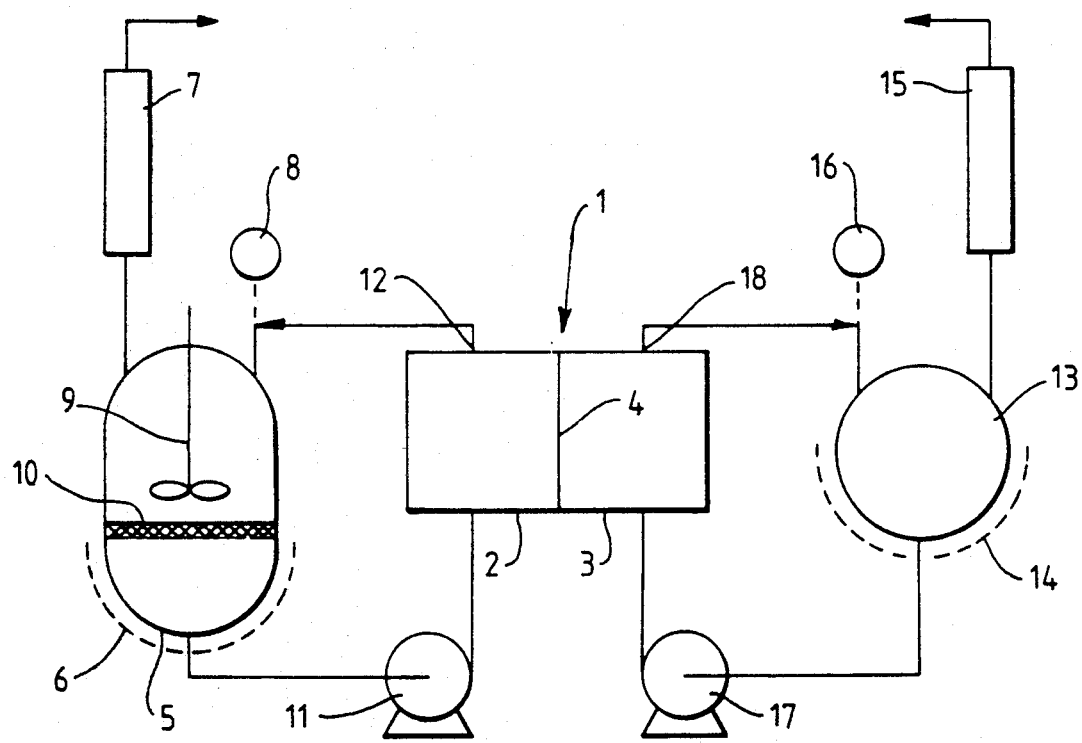

An anolyte saturator/reservoir 5 is provided with a heater 6, an anolyte vapour condensor 7, a temperature indicator 8, a stirrer 9 and a sintered glass divider 10. The anolyte reservoir 5 is connected to the anode compartment of the cell via an anolyte circulation pump 11. The anode compartment of the cell is connected via an outlet 12 to the anolyte reservoir 5.

A catholyte reservoir 13 is provided with a heater 14, a catholyte vapour condensor 15 and temperature indicator 16. The catholyte reservoir is connected to the cathode compartment of the cell via a catholyte circulation pump 17. The cathode compartment of the cell is connected via an outlet 18 to the catholyte reservoir 13.

In operation of the apparatus, anolyte solution is prepared by charging known masses of aqueous sulphuric acid and sodium sulphate to the anolyte reservoir. Sufficient sodium sulphate is added in excess of the amount required to maintain a saturated solution throughout operation. The sintered glass divider in the anolyte reservoir prevents solid sodium sulphate being drawn into the pump and blocking the cell ports. The anolyte solution is heated and circulated through the anode compartment of the cell. The catholyte is prepared by charging aqueous sodium hydroxide, of the desired concentration so as to yield sodium hydroxide of the required concentration at the end of operation, to the catholyte reservoir. The catholyte is heated and circulated through the cathode compartment of the cell. The cell may then be connected to a source of electrical power and charge passed between the anode and the cathode.

The anolyte and catholytes are continuously recirculated through the cell. The anolyte discharged from the cell returns to the anolyte reservoir, depleted in sodium sulphate and enriched with sulphuric acid, and contaminated with oxygen. The oxygen is separated and discharged by the vapour trap condensor. The solution phase is resaturated with sodium sulphate and returns to the anode compartment of the cell.

The catholyte discharged from the cell returns to the catholyte reservoir together with hydrogen produced at the cathode. The hydrogen is separated and discharged through the vapour trap condensor. The hydrogen-free catholyte is returned to the cathode compartment of the cell via the catholyte circulation pump.

Circulation of the anolyte and catholyte is continued for the required time and then the catholyte and anolyte solutions are discharged from the cell and the reservoirs.

The invention is further illustrated by the following examples which were carried out in an apparatus as described generally above.

EXAMPLE 1

This example illustrates the effect of carrying out the electrolysis of sodium sulphate with an anolyte comprising sulphuric acid and maintaining the concentration of sodium sulphate in the anolyte at greater than 30% by resaturating the anolyte stream.

A slurry comprising 0.7013 kg of sodium sulphate, 0.1016 kg of sulphuric acid and 0.6008 kg of water was charged to the anolyte reservoir. A solution comprising 0.1509 kg of sodium hydroxide and 0.8537 kg of water was charged to the catholyte reservoir. The anolyte and catholyte were circulated through the cell at a flow rate of 1.2 liters per minute and at a temperature of 62.2° C.

A current of 19.2 amperes was passed across the cell and the cell was operated for 299 minutes. The concentration of sulphuric acid and sodium sulphate in the anolyte, sodium hydroxide in the catholyte and the current efficiency were monitored and the results are shown in Table 1.

TABLE 1

| Elapsed Time min | Anolyte. $H_2SO_4$ kg/kg | Anolyte. $Na_2SO_4$ kg/kg | Catholyte. NaOH kg/kg | Current Efficiency. % |
| --- | --- | --- | --- | --- |
| 0 | 0.0873 | 0.3272 | 0.1394 | 0.0 |
| 19 | 0.0947 | 0.3365 | 0.1442 | 65.8 |
| 61 | 0.1084 | 0.3457 | 0.1522 | 66.0 |
| 79 | 0.1170 | 0.3704 | 0.1575 | 66.3 |
| 104 | 0.1276 | 0.3519 | 0.1630 | 66.6 |
| 129 | 0.1362 | 0.3753 | 0.1685 | 67.0 |
| 144 | 0.1422 | 0.3643 | 0.1717 | 67.3 |
| 164 | 0.1493 | 0.3704 | 0.1752 | 67.7 |
| 183 | 0.1541 | 0.3766 | 0.1793 | 68.1 |
| 204 | 0.1614 | 0.3674 | 0.1831 | 68.6 |
| 225 | 0.1696 | 0.3735 | 0.1860 | 69.1 |
| 244 | 0.1731 | 0.3828 | 0.1897 | 69.6 |
| 299 | 0.1871 | 0.3859 | 0.1983 | 71.1 |

The results show that even as the acid strength increases, up to 18 wt % sulphuric acid, the current efficiency of the process remains as high as 70%.

Examples 2 and 3 illustrate the effect of increasing the temperature on the current efficiency of electrolysis.

EXAMPLE 2

The procedure of Example 1 was repeated except that the anolyte comprised 0.7021 kg of sodium sulphate, 0.1002 kg of sulphuric acid and 0.6009 kg of water, the catholyte comprised 0.150 kg of sodium hydroxide and 0.8503 kg of water and the electrolysis was carried out at 72.1° C.

The results are shown in Table 2.

TABLE 2

| Elapsed Time min | Anolyte. $H_2SO_4$ kg/kg | Anolyte. $Na_2SO_4$ kg/kg | Catholyte. NaOH kg/kg | Current Efficiency. % |
| --- | --- | --- | --- | --- |
| 0 | 0.0853 | 0.3457 | 0.1416 | 0.0 |
| 21 | 0.0945 | 0.3457 | 0.1476 | 71.0 |
| 52 | 0.1083 | 0.3550 | 0.1564 | 71.5 |
| 76 | 0.1191 | 0.3396 | 0.1623 | 72.0 |
| 116 | 0.1347 | 0.3519 | 0.1721 | 72.9 |
| 145 | 0.1466 | 0.3766 | 0.1784 | 73.7 |
| 175 | 0.1563 | 0.3766 | 0.1856 | 74.6 |
| 209 | 0.1684 | 0.3365 | 0.1924 | 75.7 |
| 236 | 0.1770 | 0.3828 | 0.1986 | 76.6 |
| 267 | 0.1854 | 0.3797 | 0.2036 | 77.8 |
| 294 | 0.1945 | 0.3859 | 0.12092 | 78.8 |

EXAMPLE 3

The procedure of Example 1 was repeated except that the anolyte comprised 0.7002 kg of sodium sulphate, 0.1002 kg of sulphuric acid and 0.6001 kg of water, the catholyte comprised 0.1517 kg of sodium hydroxide and 0.8501 kg of water and the temperature was 80.3° C.

The results are shown in Table 3

TABLE 3

| Elapsed Time min | Anolyte. $H_2SO_4$ kg/kg | Anolyte. $Na_2SO_4$ kg/kg | Catholyte. NaOH kg/kg | Current Efficiency. % |
| --- | --- | --- | --- | --- |
| 0 | 0.0827 | 0.3726 | 0.1418 | 0.0 |
| 29 | 0.0955 | 0.3430 | 0.1505 | 72.9 |
| 48 | 0.1078 | 0.3479 | 0.1579 | 73.3 |
| 85 | 0.1183 | 0.3661 | 0.1655 | 74.3 |
| 118 | 0.1321 | 0.3544 | 0.1735 | 75.3 |
| 147 | 0.1442 | 0.3853 | 0.1809 | 76.2 |
| 178 | 0.1553 | 0.3797 | 0.1880 | 77.3 |
| 200 | 0.1637 | 0.4217 | 0.1938 | 78.2 |
| 223 | 0.1710 | 0.4028 | 0.1970 | 79.1 |
| 243 | 0.1777 | 0.3917 | 0.2020 | 79.9 |

The results show that at higher temperatures the current efficiency of the process is maintained at a higher level.

In the following examples 4, 5 and Comparative Example 1 which were conducted in order to simulate continuous operation of the process of the invention, the apparatus employed for Examples 1 to 3 was modified by replacing the resaturator vessel with a sodium sulphate feed reservoir vessel and an anolyte collection reservoir. In the Examples 4, 5 and Comparative Example 1, sodium sulphate feed solution is continuously fed from the feed reservoir through the anode compartment and the product from the anode compartment is continuously collected in the anolyte collection reservoir.

EXAMPLE 4

Sodium sulphate solution comprising 2.6 wt % sulphuric acid and 32.3 wt % sodium sulphate was continuously fed to, and product anolyte solution was continuously removed from, the anode compartment at a flow rate of 0.37 kg/hour for a period of 6 months. Over this time, the current efficiency was maintained at an average of 75%, and a product anolyte solution was collected with an average sulphuric acid concentration of 8% by weight.

EXAMPLE 5

The procedure of Example 4 was repeated except that the sodium sulphate feed solution comprised 8.6% sulphuric acid and 34.5% sodium sulphate. The feed solution was continuously fed and product solution continuously collected at a flow rate of 0.28 kg/hour for a period of 4 months. Over this time, the current efficiency was maintained at an average of 70%, and a product anolyte solution was collected with an average sulphuric acid concentration of over 15% by weight.

COMPARATIVE EXAMPLE 1

This example demonstrates the benefits, in terms of current efficiency and product acid strength, of operating with a sodium sulphate solution having a concentration greater than that obtainable using a neutral sodium sulphate solution.

The procedure of Example 4 was repeated except that the sodium sulphate feed solution comprised 10.7% sulphuric acid and 25.0% sodium sulphate. The feed solution was continuously fed and product solution continuously collected at a flow rate of 0.30 kg/hour for a period of 1 month. Over this time, the current efficiency was maintained at an average of 58%, and a product anolyte solution was collected with an average sulphuric acid concentration of 15% by weight.

I claim:

1. In an electrochemical process for the production of sulphuric acid and sodium hydroxide by the electrolysis of an aqueous solution of sodium sulphate the improvement wherein the aqueous sodium sulphate solution which is electrolysed is an acidified aqueous sodium sulphate solution having a sodium sulphate concentration which is greater than that of a saturated solution of sodium sulphate in water under neutral conditions at the temperature employed.

2. A process as claimed in claim 1 in which the concentration of the aqueous sodium sulphate solution which is electrolysed is greater than 32 wt % based on the total weight of the solution.

3. A process as claimed in claim 2 in which the concentration of the aqueous sodium sulphate solution which is electrolysed is greater than 34 wt % based on the total weight of the solution.

4. A process as claimed in claim 1 in which the process is operated in an electrolytic cell comprising at least one anode in an anode compartment separated from at least one cathode in a cathode compartment, said anode and cathode compartments being separated by a cation-exchange membrane.

5. A process as claimed in claim 1 in which the aqueous sodium sulphate which is electrolysed further comprises sulphuric acid.

6. A process as claimed in claim 5 in which the aqueous sodium sulphate solution comprises at least 0.5 wt % sulphuric acid.

7. A process as claimed in claim 6 which is operated at a temperature of at least 65° C.

8. A process as claimed in claim 7 which comprises dissolving sodium sulphate in an aqueous solution of sulphuric acid to a concentration greater than that of a saturated solution of sodium sulphate under neutral conditions and at the temperature employed and electrolysing the solution.

9. A process as claimed in claim 8 in which the concentration of the aqueous sodium sulphate solution is maintained at greater than that of a saturated solution of sodium sulphate under neutral conditions and at the temperature employed, by recirculating the aqueous sodium sulphate solution and at least a part of the sulphuric acid produced through a sodium sulphate resaturation vessel.

* * * * *